United States Patent [19]

Allen

[11] 4,424,776
[45] Jan. 10, 1984

[54] FUEL SUPPLY FOR A DIESEL ENGINE

[75] Inventor: Walter E. Allen, Prospect, Conn.

[73] Assignee: Transamerica DeLaval Inc., Princeton, N.J.

[21] Appl. No.: 364,800

[22] Filed: Apr. 2, 1982

Related U.S. Application Data

[62] Division of Ser. No. 145,347, Apr. 10, 1980, Pat. No. 4,351,301.

[51] Int. Cl.³ ............... F02N 17/02; B01D 35/02
[52] U.S. Cl. ............... 123/142.5 R; 123/549; 123/142.5 E; 219/205; 165/104.28
[58] Field of Search ............... 123/557, 549, 142.5 R, 123/142.5 E; 219/201, 205, 207, 208; 165/42, 51, 107

[56] References Cited

U.S. PATENT DOCUMENTS

| 2,023,185 | 12/1935 | White ............... 219/205 |
| 2,346,506 | 4/1944 | Pulliam ............... 219/205 |
| 2,916,030 | 12/1959 | Hoeth ............... 123/142.5 E |
| 3,134,374 | 5/1964 | Stevens ............... 123/142.5 E |
| 3,817,043 | 6/1974 | Zoleta ............... 219/208 |
| 4,249,491 | 2/1981 | Stein ............... 123/142.5 R |

FOREIGN PATENT DOCUMENTS

| 519090 | 12/1955 | Canada ............... 219/205 |
| 2845519 | 5/1980 | Fed. Rep. of Germany ...... 219/205 |

Primary Examiner—Wendell E. Burns
Attorney, Agent, or Firm—Hopgood, Calimafde, Kalil, Blaustein & Judlowe

[57] ABSTRACT

The invention contemplates a continuously circulating pumped flow of diesel-engine fuel, involving thermodynamic coupling to the engine's coolant-circulation system (a) while the engine is operating and (b) involving selectively available thermodynamic coupling to an externally supplied electric-heater element during periods of engine shut-down. To assure fuel circulation during such operation of the heater element, a rectifier taps the external electric supply to provide pump excitation and thus not to drain the charge on the storage battery associated with the engine.

11 Claims, 3 Drawing Figures

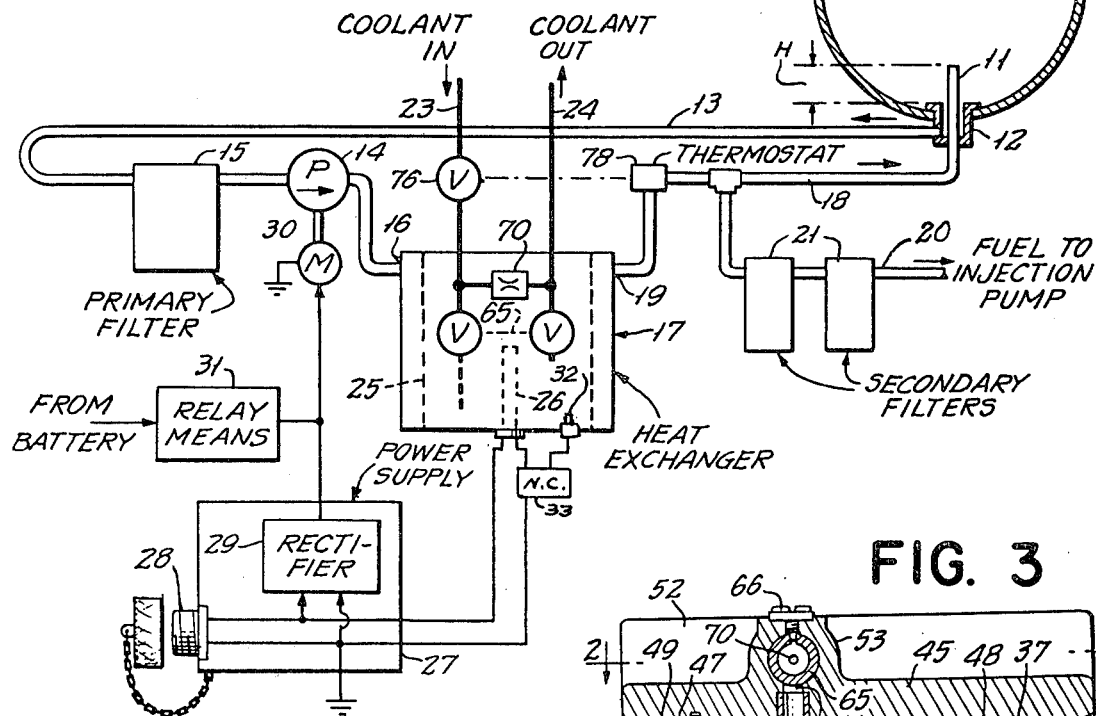
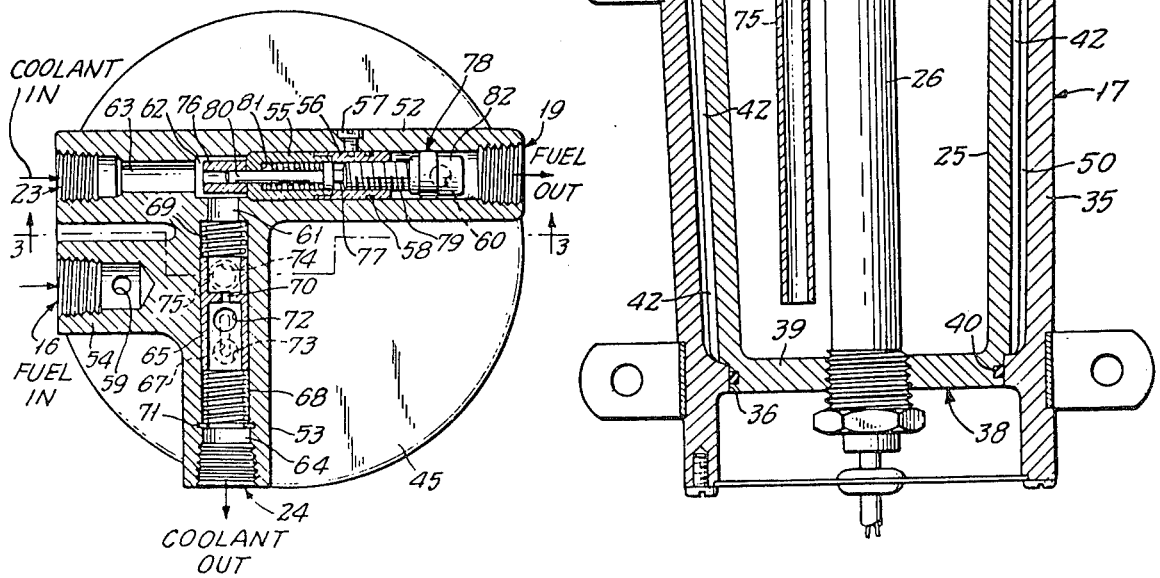

FUEL SUPPLY FOR A DIESEL ENGINE

This application is a division of U.S. application Ser. No. 145,347. filed Apr. 10, 1980 now U.S. Pat. No. 4,351,301.

BACKGROUND OF THE INVENTION

The invention relates to means for heating fuel used in operation of a diesel engine, and in particular to the provision of such heating both during operation of the engine and in periods between successive uses of the engine.

In colder climates, diesel operation has encountered a problem attributable to formation of wax crystals, due to paraffin content of the fuel. For reasons of economy, No. 2 fuel oil is desired, but this grade is afflicted with the wax problem, which can be as severe as to clog the filter system, located prior to the injector pump, thus starving the engine of fuel. To avoid the problem, No. 1 fuel (kerosene) has been recommended, but the incremental cost per gallon is not palatable. The other answer to the problem is to provide means for heating the fuel.

To my knowledge, prior and existing fuel heaters associated with diesel engines, such as truck engines, farm-tractor engines and the like have employed a shell and tube heat-exchanger arrangement wherein fuel on its way from the tank to the fuel-injection system of the engine is coursed through the tube or tubes, while a flow of the liquid coolant used to remove engine heat is coursed through the shell, in heat-transfer relation with the flow of fuel to the injection system. In such an arrangement, the fuel is warmed only if the engine has been run long enough to sufficiently warm the flow of engine coolant, and the only fuel that is warmed is that which is on its way directly to the fuel-injection system of the engine.

Also, to my knowledge, for colder climates and to ease the problem of start-up after engine shut-down, for example after an overnight shut-down, the practice is to install an engine-block heater element, adapted for selective and detachable connection to an external source of electric power. But this practice provides little or no heating of the fuel that is supplied or is to be supplied to the fuel-injection system of the engine.

BRIEF STATEMENT OF THE INVENTION

It is an object of the invention to provide an improved means of fuel supply to the fuel-injection system of a diesel engine, featuring adequately heated fuel, regardless of climate conditions, and regardless of the period of engine shut-down between successive uses of the engine.

It is a specific object of the invention to meet the above object with a continuously circulating fuel supply system, wherein the circulating fuel is heated, and wherein the fuel supplied to the fuel-injection system is drawn from the flow of circulating fuel.

Another specific object is to achieve the above objects with a circulating-fuel path which includes tank fuel and all lines in the circulating path.

It is also a specific object to provide for use of circulating engine coolant to heat circulating fuel during engine operation and for optional use of local electric power to heat circulating fuel during periods of engine shut-down.

The invention achieves the foregoing objects and further features by establishing a fuel-circulation path which importantly includes a fuel-circulating pump, a heat exchanger, and at least part of the inner volume of the fuel tank from which the engine operates, the fuel to the fuel-injection system being drawn by direct tapping of the fuel-circulation line, at a location close to the fuel-injection system. The heat exchanger has means for accommodation of a flow of warm engine coolant in thermodynamically coupled relation to the circulating flow of fuel. The heat exchanger also includes an electric-heater element, with provision for optional detachable connection to an external power source during periods of engine shut-down, and if the electric heater is thus operated, the external-source connection is additionally used to drive the fuel-circulation pump, so as to avoid undue battery drain. Various automatically operative thermostatic devices enhance operation of the system.

DETAILED DESCRIPTION

The invention will be illustratively described for a preferred embodiment in conjunction with the accompanying drawings, in which:

FIG. 1 is a simplified overall diagram of the diesel-fuel supply system of the invention, importantly including a heat-exchanger device of the invention; and FIGS. 2 and 3 are, respectively, horizontal and vertical sectional views of the heat exchanger of FIG. 1, to an enlarged scale and in much greater detail, the section plane of FIG. 2 being indicated at 2—2 in FIG. 3, and the section plane of FIG. 3 being indicated at 3—3 in FIG. 2.

Referring initially to FIG. 1, the invention is shown in application to fuel-supply components used in and with a diesel engine, such as a farm-tractor engine, or a tractor-trailer or the like truck engine, or a fixed-installation engine as for water-pumping use. The engine itself is not shown, but the fuel-supply components are seen to include a fuel tank 10 and a continuously circulating fuel line in which the tank 10 is series-connected. To this end, a fuel-in connection 11 to tank 10 is an upstanding pipe which discharges return fuel into the tank at a small vertical offset H above the tank bottom, where a fuel-out connection 12 is made concentrically around the fuel-in connection 11. The fuel-circulation line includes external tubing 13 from the fuel-out connection 12 to a circulation pump 14, by way of a primary filter 15; the pump output is supplied directly to the fuel-in connection or port 16 of a heat exchanger 17, and the fuel-circulation loop is completed by return tubing 18 which connects the fuel-out port 19 of the heat exchanger, to the fuel-in connection 11 at tank 10. Fuel to the injection system of the engine is supplied via a line 20 which is tapped to the return length 18 of the fuel-circulation loop, and one or more secondary filters 21 are preferably in the line 20 to assure cleanliness of fuel input to the engine; the line 20 is preferably short, i.e., the point of its connection to tubing 18 is close to the customary pump (not shown) of the engine's fuel-injection system.

The engine will be understood to include its liquid-coolant circulating system (not shown) having means for shunt-path inclusion of the heat-exchanger 17 in the coolant circulation system. In FIG. 1, such inclusion is indicated by a coolant-in connection 23 to the heat-exchanger 17 and by a corresponding coolant-out line connection 24, whereby a coolant flow through the heat exchanger may be driven by the coolant-pump system (not shown) of the engine.

The heat exchanger 17 will be later described in detail in connection with FIGS. 2 and 3, but it will suffice for the present to indicate that it comprises spaced inner and outer shells, the inner shell 25 being indicated by dashed lines; shell 25 will be understood to provide a hydraulically separated but thermodynamically coupled relation of fuel flow between ports 16–19 (via tha space between shells) to coolant flow between lines 23–24 (via the chamber volume within the inner shell 25). Various valve and other control elements §65, 70, 76, 78) are also schematically indicated in FIG. 1 in connection with heat-exchanger 17, but these will be described in connection with FIGS. 2 and 3.

An electrical immersion-type rod heater element 26 is fixed to the base of the heat-exchanger and extends upward into the coolant-circulation volume within inner shell 25. The heater element 26 is served by a power-supply unit 27 fixedly installed at the engine locale, conveniently accessible for optional external connection via a suitable detachable fitting 28 to an external source of electric power, such as commonly available 120 volts a-c. In the event of such external power connection of heater element 26, a rectifier 29 contained within power supply 27 becomes operative to drive the motor 30 for pump 14. Preferably, the voltage output of rectifier 29 slightly exceeds the rated voltage output (e.g., 24 volts) of the battery associated with the engine, so that in addition to powering the pump motor 30, rectifier 29 provides a weak residual battery-charging potential; top condition of the battery is thus assured, particularly when external connection is made at 28, for an overnight period between successive uses of the engine. For safety assurance that heater 26 will not be operated if coolant in the chamber 25 becomes too hot, a thermostatic element 32 is shown operatively associated with normally closed relay contacts 33 in the supply connection to heater 26.

In the normal operation of the diesel engine, it will be understood that a hold-in relay 31 will have been picked up to close a circuit from the battery to the pump motor 30, thus assuring operation of the fuel-circulation system at least as long as the engine is running. This relay 31 will drop out upon stopping the engine, and of course power to the pump motor 30 is resumed after stopping the engine, once the external-source connection is made at 28.

Referring now to FIGS. 2 and 3 for greater detail, the heat-exchanger 17 is seen to comprise an outer tubular shell or casing 35 having an internal cylindrical land 36 at its lower end, and a cylindrical counterbore 37 at its upper end. The inner shell 25 of FIG. 1 is seen in FIG. 1 as the generally cylindrical skirt of a cupped insert subassembly 38 having a bottom closure wall 39 to the center of which the heater element 26 is securely mounted. The lower end of insert 38 is reduced and peripherally grooved for an O-ring sealed fit at 40 to the land 36. At its upper end, the insert 38 has a short radial flange 41 for stabilized location in the counterbore 37, and an angularly spaced plurality of longitudinally extending radial fins 42 characterizes the otherwise cylindrical periphery of skirt 25, between flange 41 and the land 36. At its upper end, skirt 25 has a cylindrical counterbore 43 which axially laps an axially short annular flange 44, the latter being a dependent inner feature of an upper-end closure or cap member 45. Cap member 45 also includes an outer dependent flange 46 which is internally threaded for secure engagement with the externally threaded upper end of the casing 35. A locking pin 47 keys inner shell 25 against rotation with respect to cap member 35, and O-ring seals at 48–49 (in conjunction with the O-ring seal 40) assure sealed hydraulic independence of the annular space 50 (between shell 25 and casing 35) for purposes of fuel flow between the fuel-in port 16 and the fuel-out port 19, as will become more clear; at the same time, the O-ring seal 48 assures sealed hydraulic independence of the path between the coolant-in connection 23 and the coolant-out connection 24, as will also become more clear.

As indicated above, various valve and other control features have been incorporated in the heat-exchanger 17, and for ease of construction, assembly and access, these are all shown embodied in or carried by the cap member 45, within intersecting upstanding rib formations 52–53–54 in the exposed upper side of cap member 45. More specifically, a characterized straight bore which initially provides a through passage within rib 52 and between ports 23 and 19, is internally closed by telescoped first and second housing or guide parts 55–56 of a thermostatic-valve subassembly, seated in a counterbore in the passage between ports 23 and 19, axially and angularly locked by the reduced end of a set screw 57, and isolating the coolant-in port 23 from the fuel-out port 19 at an O-ring seal 58.

Fuel entry into the heat-exchanger 17 is via port 16 in rib formation 54, having axially downward passage connection at 59 through the lower face of cap member 54 and through an aligned aperture (not shown) in flange 41, for direct downward supply of circulating fuel into the annular space 50, where it is subject to heating by heat transfer via the finned surface 42 of inner shell 25. Heated-fuel exit flow from the annular space 50 to the fuel-out port 19 is via similar axially aligned apertures 60 at a generally diametrically opposed location, which communicates with the bore between ports 23 and 19, but on the fuel-out side of the isolating O-ring seal 58.

For continuity of coolant flow from the coolant-in port 23 to the coolant-out port 24, a bore 61 within rib 53 communicates directly between port 24 and an intermediate counterbore 62, the latter being a feature of the bore 63 between ports 23 and 19, but on the coolant-in side of the isolating O-ring seal 58. Except for its inner end at intersection with counterbore 62, the bore 61 is characterized by an elongate cylindrical counterbore 64 within which a hollow cylindrical spool-valve member 65 is longitudinally movable between axial limits determined by engagement of the reduced key-pin end of a screw 66, in a straight slot 67 in the downstream half of valve member 65. Valve member 65 is positioned by the differential action of a bias spring 68 at its downstream end and a thermostatically responsive spring 69 at its upstream end; and a bleed orifice 70 in a barrier wall within valve member 65 assures such minimum flow of coolant from port 23 to port 24 via the intermediate counterbore 62 as to enable reliable thermal response of spring 69 to the currently heated condition of engine coolant. The spring 69 is of the so-called shape-memory-effect variety, having the property of rather quickly uncoiling and thus axially expanding when exposed to liquid which reaches a given temperature threshold region; the particular temperature at which this elongation will occur is determined by reaction to the bias setting of spring 68, being here determined also by the axial location of a retaining snap ring 71, by which the compressional bias of spring 68 is referenced. Generally speaking, the springs 68–69 should be selected to provide an opening displacement of valve member 65 (downward, in the sense of FIG. 2, from the up or "closed" position shown in FIG. 2) when sensed coolant temperature reaches about 130° F., thus enabling an operating range above this level, for passage of coolant flow in the chamber within skirt 25, as will become clear.

The valve member or spool 65 includes a side-valve port 72 which registers with a downward passage 73 (to the upper end of the chamber volume within skirt 25) when valve member 65 has been thermally actuated from its closed position shown, to its above-identified open position. Such actuation of valve member 65 also displaces the upstream end of member 65 so as to uncover and thus open a second downward passage 74 in cap member 45. The passage 74 serves coolant flow controlled by the upstream end of valve member 65, for entry into the chamber volume within skirt 25; and the passage 73 serves coolant flow controlled by the valve-port 72 at the downstream end of valve member 65. An elongate vertical tube 75 fixed to cap member 45 at passage 74 extends to the lower region of the chamber volume of skirt 25 and thus, upon "open" actuation of valve member 65, enables discharge of warm coolant via tube 75 into this lower region, it being understood that the flowing coolant leaves this volume via the upper level (at the inner surface of cap member 45) where the passage 73-72-24 is open and free.

When the engine is shut off and coolant temperature sensed at 69 drops below threshold (e.g., below 130° F.), valve member 65 returns to its closed position, and the coolant within the chamber volume of skirt 25 remains locked in place as long as the engine is not operating. If use is made of the electric-heater option, the heater element 26 heats the trapped coolant within skirt 25 and, via skirt 26 and its fins, transfers heat to the fuel flowing in the annular space 50, it being understood that the making of the heater connection also excited the pump motor, for continuous fuel circulation via the loop 13-18 and its described series-connected components, including heat-exchanger 17.

Assuming that the fuel-circulation system has been thus operated by external-source connection at 28, the engine is ready for starting with a good supply of warm fuel, whatever the period of shutdown, and whatever the climate adversity. Of course, the external-source connection is detached upon starting, whereupon the hold-in relay 31 (which picks up upon engine-starting) holds the battery connection to pump motor 30, as long as the engine is operating, thus assuring fuel circulation via the described loop during engine operation. By reason of electric-heater operation during non-use of the engine, a mushroom-like volume of fuel in the tank and in the surrounding vicinity of the fuel-in and fuel-out connections 11–12 will have been warmed as part of the circulating flow, so that a reasonable volume of warmed fuel is ready to carry a just-started engine to the point of warming its coolant liquid to the indicated threshold (e.g., about 130° F.) at which valve member 65 opens to allow warm-coolant flow to heat the circulating fuel.

As a further feature of the heat-exchanger 17, a thermostatically operated safety shut-off valve is additionally incorporated in the cap member 45. This valve includes a valve member 76 which when actuated shifts leftward from its open position (shown in FIG. 2) to a closed position of plugging coaction with the bore 63 which serves the coolant-in port 23. The thermostatically operated element 77 which drives valve member 76 is contained in and movably projects from an assembled unit 78 which is mounted by sealed threads 79 to the housing element 56, already described; the element 77 abuts the headed end of a stem 80, guided by the housing element 55 and press-fitted to valve member 76 at its forward end, and a bias spring 81 within housing element 55 normally urges valve member 76 to its open position (shown). The assembled thermostatic unit 78 may be a so-called thermostatic-wax power element, being one of the commercially available products of Century Brass Company, Waterbury, Conn., and its heat-sensitive wax element is contained within a shell 82, shown positioned immediately in the path of the flow of heated fuel, as it emerges from passage 60 on its way to the fuel-out port 19. The thermostatic assembly 78 is so selected, positioned and biased at 81 that safety shut-off of coolant flow (by valve closure at 72, to 63) occurs upon element 82 sensing heated-fuel temperature at a predetermined upper limit, for example at about 90° F. And it will be understood that such shut-off of coolant flow through the heat-exchanger 17 merely means that the circulating fuel flow is warm enough and does not need any additional heat from engine coolant.

It will be seen that the described structure and system meets all stated objects and provides significant advantages, economies and convenience over existing and past attempts to cope with the problems of starting diesel engines after extended shut-down and under adverse climate conditions. In particular, this invention, for the first time, as far as I am aware, makes it possible for the engine to draw promptly upon a supply of warm fuel, with a sufficient volume to allow the engine to warm its coolant (and continue to warm the circulating fuel) and thus never to subject the engine to operation with cold fuel. As a practical matter, I find that a 1000-watt heater at 26 adequately serves diesel engines having fuel-tank capacities ranging from 50 gallons to 200 gallons.

While the invention has been described in detail for the preferred form, it will be understood that modifications may be made without departure from the scope of the invention.

What is claimed is:

1. As an article of manufacture, a fuel-heating unit adapted for use with a diesel engine having a fuel-injection system and a circulating flow of liquid coolant, said unit being further adapted for use in a circulating fuel-supply system from which fuel is to be drawn for supply of the fuel-injection system, said article comprising a housing enclosure with coolant-in and coolant-out ports for series-connection in the circulating flow of liquid coolant and with fuel-in and fuel-out ports for series-connection in the circulating flow of fuel, the respective paths of coolant flow and of fuel flow within said enclosure being in hydraulically independent but thermodynamically coupled relation, thermostatic-valve means associated with the path of coolant flow and responsive to sensed coolant temperature to substantially curtail the rate of coolant flow for coolant temperatures below a predetermined normal operating range of coolant temperature, said thermostatic-valve means being further responsive to sensed coolant temperature within said range to permit an increased rate of coolant flow, and electrical heater-element means within said housing enclosure in heat-transfer relation with one of said paths, said last-defined means being adapted for selective external power-supply connection.

2. The article of claim 1, in which said heater-element means is in direct heat-transfer relation with the path of coolant flow.

3. The article of claim 1, in which said housing enclosure comprises spaced inner and outer shells, the path of fuel flow being in the space between said shells, and the path of coolant flow being within the inner shell, said heater-element means being positioned within said inner shell.

4. The article of claim 1, in which said path of coolant flow is one of two paths of coolant flow between said coolant-in and coolant-out ports, said one coolant path including said valve means and the other coolant path including bleed means for assuring at least a small flow of coolant in shunt with said one coolant path, said thermostatic-valve means including a heat-sensing element exposed to coolant in said other coolant path.

5. The article of claim 1, in which further thermostatic-valve means is associated with the path of coolant flow and is responsive to sensed fuel temperature at or near the fuel-out port to substantially cut off the flow of coolant between the coolant-in and coolant-out ports for sensed fuel temperature at a predetermined upper safety limit of fuel temperature.

6. As an article of manufacture, a fuel-heating unit adapted for use with a diesel engine having a fuel-injection system and a circulating flow of liquid coolant, said unit being further adapted for use in a circulating fuel-supply system from which fuel is to be drawn for supply of the fuel-injection system, said article comprising a housing enclosure with coolant-in and coolant-out ports for series-connection in the circulating flow of liquid coolant and with fuel-in and fuel-out ports for series-connection in the circulating flow of fuel, the respective paths of coolant flow and of fuel flow within said enclosure being in hydraulically independent but thermodynamically coupled relation, thermostatic-valve means associated with the path of coolant flow and reponsive to sensed fuel temperature at or near the fuel-out port to substantially cut off the flow of coolant between the coolant-in and coolant-out ports for sensed fuel temperature at a predetermined upper safety limit of fuel temperature.

7. The article of claim 3, in which the outer surface of the inner shell is characterized by plural fins coursed by fuel flow in the region between shells, for enhanced heat transfer between said flows.

8. The article of claim 1, in which said thermostatic-valve means includes a valve member actuated by a thermally responsive spring of the shape-memory-effect variety.

9. The article of claim 8, in which a preload spring normally urges said valve member in the direction to curtail the rate of coolant flow and in opposition to action of said thermally responsive spring, the bias-level of said preload spring being selected to be overcome for thermal-spring response to achievement of coolant temperature within said range thereby permitting an increased rate of coolant flow.

10. The article of claim 4, in which said one path of coolant flow is the only path having thermodynamically coupled relation with the flow of fuel, and in which said thermostatic valve means is operative (a) to shut off coolant flow in said one path when coolant temperature sensed in said other path is below said range and (b) to open for coolant flow in said one path when coolant temperature sensed in said other path is within said range.

11. The article of claim 10, in which thermostatic control means for said electric heater is positioned for response to coolant temperature in said one path, the sense of said control means being to supply electrical excitation to said heater when coolant temperature in said one path is below said range; whereby during periods of inadequate fuel-heating through heat exchange with circulating coolant, a circulating of fuel through said article may be electrically heated.

* * * * *